United States Patent
Ou et al.

(10) Patent No.: US 8,782,006 B1
(45) Date of Patent: Jul. 15, 2014

(54) METHOD AND APPARATUS FOR FILE SHARING BETWEEN CONTINUOUS AND SCHEDULED BACKUPS

(75) Inventors: Pu Ou, San Luis Obispo, CA (US); Dale Cardin, San Luis Obispo, CA (US); Anthony T. Orling, San Luis Obispo, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/434,118

(22) Filed: Mar. 29, 2012

Related U.S. Application Data

(63) Continuation of application No. 11/643,255, filed on Dec. 21, 2006, now Pat. No. 8,150,810.

(51) Int. Cl.
*G06F 17/30* (2006.01)
(52) U.S. Cl.
USPC .......................... 707/647; 707/641; 707/646

(58) Field of Classification Search
USPC .................................. 707/648, 641, 646, 647
See application file for complete search history.

(56) References Cited

U.S. PATENT DOCUMENTS

| | | | |
|---|---|---|---|
| 2002/0174139 A1* | 11/2002 | Midgley et al. | 707/204 |
| 2006/0036890 A1* | 2/2006 | Henrickson | 714/2 |
| 2006/0149889 A1* | 7/2006 | Sikha | 711/100 |

* cited by examiner

*Primary Examiner* — Ajay Bhatia
*Assistant Examiner* — Kurt Mueller
(74) *Attorney, Agent, or Firm* — Campbell Stephenson

(57) ABSTRACT

Method and apparatus for file sharing between continuous and scheduled backups is described. One example relates to backing up source data stored by a computer system. A first portion of the source data is backed up at points in time in response to a backup schedule to produce a plurality of partial backups. A second portion of the source data is backed up continuously in response to changes of the second portion to maintain a replica of the second portion. The replica of the second portion is linked to the plurality of partial backups to produce a respective plurality of full backups of the source data.

26 Claims, 4 Drawing Sheets

METHOD AND APPARATUS FOR FILE SHARING BETWEEN CONTINUOUS AND SCHEDULED BACKUPS

CROSS-REFERENCE TO RELATED APPLICATIONS

The present patent application is a continuation of U.S. patent application Ser. No. 11/643,255, filed on Dec. 21, 2006 now U.S. Pat. No. 8,150,810, entitled "Method and Apparatus for File sharing Between Continuous and Scheduled Backups" and is incorporated by reference herein in its entirety and for all purposes.

BACKGROUND OF THE INVENTION

1. Field of the Invention

Embodiments of the invention generally relate to data backup systems and, more specifically, to a method and apparatus for file sharing between continuous and scheduled backups.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. Erroneous software or hardware operation may corrupt the data stored on a storage device and effectively destroy the data stored on an otherwise properly functioning storage device.

To mitigate the risk of losing data, computer networks include backup systems for making backup copies of data stored on various storage devices. One type of backup system includes a dedicated backup server that backs up target data on one or more storage devices used in or by one or more computer systems, such as workstations and/or application servers. The backup server typically backs up the target data periodically according to a schedule. The data may be backed up initially to disk-based storage and then migrated to an archival storage, such as tape-based storage. The backup server may implement any of various known schemes to backup data, including full backups, incremental backups, differential backups, and the like. A full backup is a complete copy of the target data. An incremental backup is a backup that only contains the files that have changed since the most recent backup (either full or incremental). A differential backup is a cumulative backup of all changes made since the last full backup.

Another type of backup system includes a continuous protection backup sever that maintains a continuous replica of the target data in real-time. The target data of continuous protection is typically critical data. In a typical continuous backup scheme, block-level changes of the target data are transmitted to the continuous protection backup server as they occur. The replica of the target data maintained by the continuous backup server may itself be backed up to a schedule-based backup server.

In some cases, a combination of continuous and schedule-based backup is performed for given target data. The target data is subject to scheduled-based backup. Critical portions of the target data are also subject to continuous backup. In such a scheme, however, the same data is backed up multiple times resulting in multiple copies of the same data. Such duplication of backup data is inefficient and wastes backup storage space. Accordingly, there exists a need in the art for more efficient continuous and schedule-based backup of target data.

SUMMARY OF THE INVENTION

Method and apparatus for file sharing between continuous and scheduled backups is described. An aspect of the invention relates to backing up source data stored by a computer system. A first portion of the source data is backed up at points in time in response to a backup schedule to produce a plurality of partial backups. A second portion of the source data is backed up continuously in response to changes of the second portion to maintain a replica of the second portion. The replica of the second portion is linked to the plurality of partial backups to produce a respective plurality of full backups of the source data.

Another aspect of the invention relates to an apparatus for backing up a source data stored by a computer system. The apparatus includes a first backup server, a second backup server, and a control module. The first backup server is configured to backup up a first portion of the source data at points in time in response to a backup schedule to produce a plurality of partial backups. The second backup server is configured to back up a second portion of the source data continuously in response to changes of the second portion to maintain a replica of the second portion. The control module is configured to link the replica of the second portion to the plurality of partial backups to produce a respective plurality of full backups of the source data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
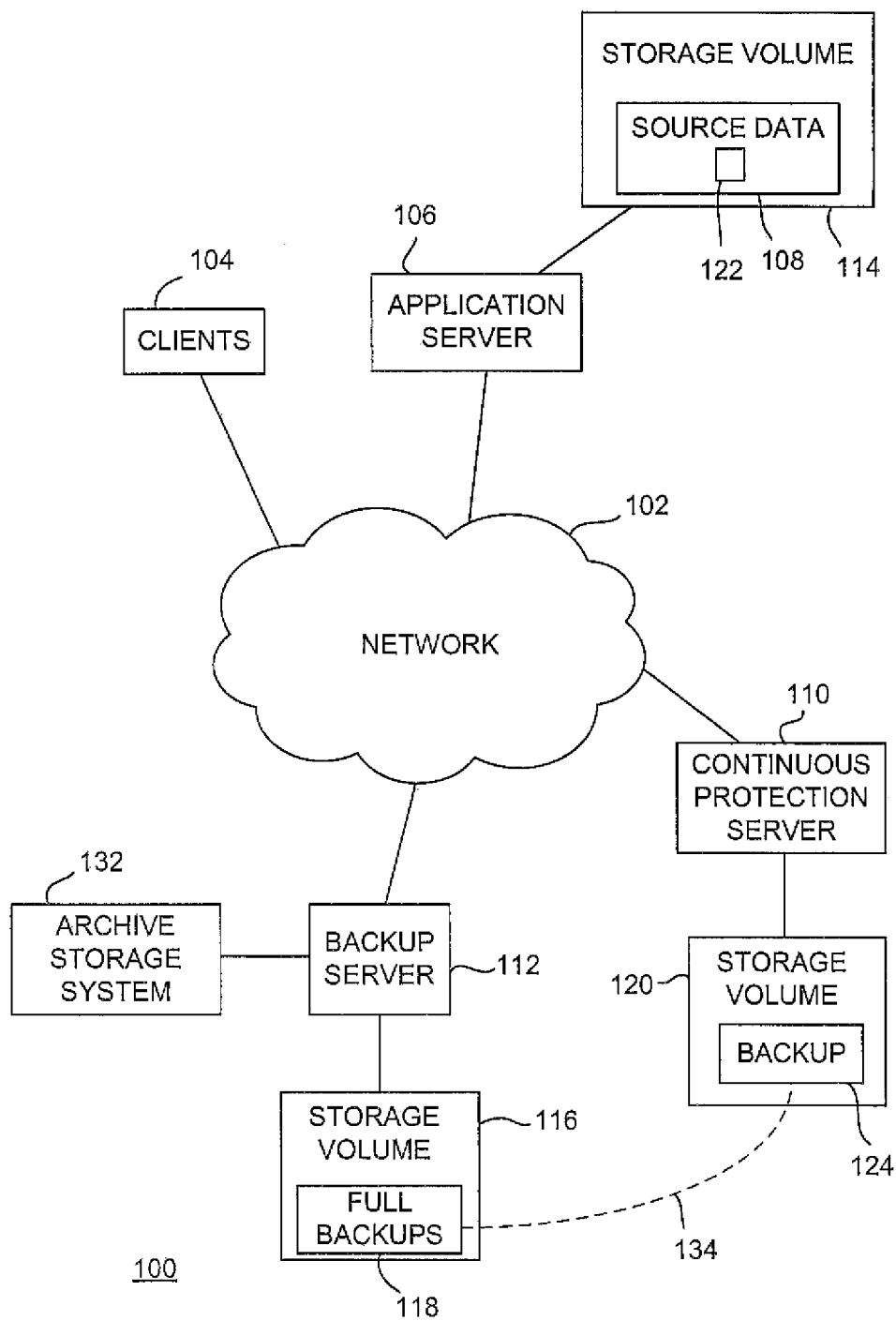
FIG. 1 is a block diagram depicting an exemplary embodiment of a computer network in accordance with one or more aspects of the invention.

FIG. 1 is a block diagram depicting an exemplary embodiment of a computer network 100 in accordance with one or more aspects of the invention. The computer network 100 includes a network 102, clients 104, an application server 106, a continuous protection server 110, a backup server 112.

The clients 104 are configured for communication with the application server 106 via the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communication information. The clients 104 may comprise various types of computers, such as laptops, desktop computers, workstations, and the like. The application server 106 hosts a service for the clients 104. For example, the application server 106 may be a file server, e-mail server, terminal server, or the like. The application server 106 may be implemented using any type of computer system capable of hosting services for the clients 104.

The application server 106 manages a storage volume 114. The storage volume 114 may be implemented using any type of storage system, such as a disk drive system. A disk drive system may include, for example, one or more storage disks, e.g., an array of storage disks or redundant array of storage disks. A volume, as used herein, relates to a particular storage area. A volume does not necessarily correspond to any particular physical storage device. A physical storage device may include more than one volume, and a volume may span more than one storage device. Moreover, a volume may be in one logical partition or multiple logical partitions. The storage volume 114 stores source data 108, such as application programs and program data created and managed by the application server 106. The source data is organized into a file system. A file system refers to the structure and arrangement of files in a storage device. For example, a file system typically includes a hierarchy of directories, each of which may contain one or more files.

The backup server 112 hosts a scheduled backup service for the application server 106. The backup server 112 may be implemented using any type of computer system capable of hosting a backup service. The backup server 112 is configured to manage a storage volume 116. The storage volume 116 may be implemented using the same storage system that implements the storage volume 114, or using a separate storage system (e.g., a separate disk drive system). The backup server 112 is also coupled to a tape drive system 132. The tape drive system 132 may include one or more tape drives. The storage volume 116 stores full backups 118 of the source data 108. In particular, the backup server 112 is configured to back up the source data 108 at points in time in accordance with a defined schedule ("schedule-based backup") to produce the full backups 118. Each of the full backups 118 represents the state of the source data 108 at a given time. For example, the source data 108 may be backed up once a day (e.g., nightly backups). Generation of the full backups 118 is discussed further below.

The continuous protection server 110 hosts a continuous backup service for the application server 106. The continuous protection server 110 may be implemented using any type of computer system capable of hosting the continuous protection service. The continuous protection server 110 may be implemented using the same computer system that implements the backup server 112, or using a separate computer system. The continuous protection server 110 is coupled to a storage volume 120. The storage volume 120 may be implemented using the same storage system that implements the storage volume 114 and/or the storage volume 116, or using a separate storage system (e.g., a separate disk drive system). The storage volume 120 maintains a backup 124 of a particular portion 122 of the source data 108. The portion 122 may include one or more files in the file system of the source data 108. In particular, the continuous protection server 110 is configured to back up the portion 122 continuously in response to changes in the portion to maintain the backup 124. Accordingly, the backup 124 includes a replica of the portion 122 at any given time. Typically, the portion 122 of the source data 108 subject to continuous backup includes data critical to the application server 106 and/or the clients 104. It is not necessary, however, that the portion 122 be deemed critical. The continuous protection server 110 receives a stream of changes to portion 122 such that the backup 124 is continuously updated. Notably, the backup 124 may store file change information in addition to the replica of the portion 122. For example, the continuous protection server 110 may be configured to periodically produce snapshots of the backup 124 in order to preserve file version information. Exemplary software capable of performing continuous backups includes the BACKUP EXEC 11d family of products, commercially available from Symantec Corporation of Cupertino, Calif.

In one aspect of the invention, the scheduled backups performed by the backup server 112 are configured to backup the portion of the source data 108 other than the critical portion 122. That is, the portion 122 is not backed up as part of the scheduled backups performed by the backup server 112. Each scheduled backup produces a partial backup associated with a point in time, which is stored in the storage volume 116.

In one embodiment, the backup server 112 notifies the continuous protection server 110 as to the locations of the partial backups on the storage volume 116 as each partial backup is stored. At a particular point in time in which a partial backup is made, the backup 124 represents the current state of the portion 122. Upon being informed of the location of a particular partial backup, the continuous protection server 110 creates a link 134 to each file in the backup 124 and stores the link(s) in the location of the partial backup. In one embodiment, each link is a hard link. A hard link is a directory entry in the file system represented by the partial backup. Each file in a file system can have one or more hard links. For example, a hard-link feature is included in the NTFS file system provided as part of MICROSOFT WINDOWS operating systems. The combination of the partial backup and link(s) defines a full backup of the source data 108 at the given time. In this manner, multiple backup copies of the portion 122 are not maintained in the system 100.

As described above, the continuous protection server 110 may also maintain file version information via snapshots. Accordingly, the continuous protection server 110 does not necessarily delete a file in the backup 124 just because the file has been deleted from the portion 122. Rather, a given file in the backup 124 is not deleted until there are no more links to the file. The backup server 112 is configured to migrate the full backups 118 to the archive storage system 132 periodically. When a full backup is migrated to archival storage, the backup server 112 deletes the full backup from the storage volume 116. This includes deletion of any created links to files in the backup 124 maintained by the continuous protection server 110. When all links to a given file are deleted, the file itself is deleted. This may be automatic, depending on the particular format of the file system (e.g., NTFS).

Figure 2:
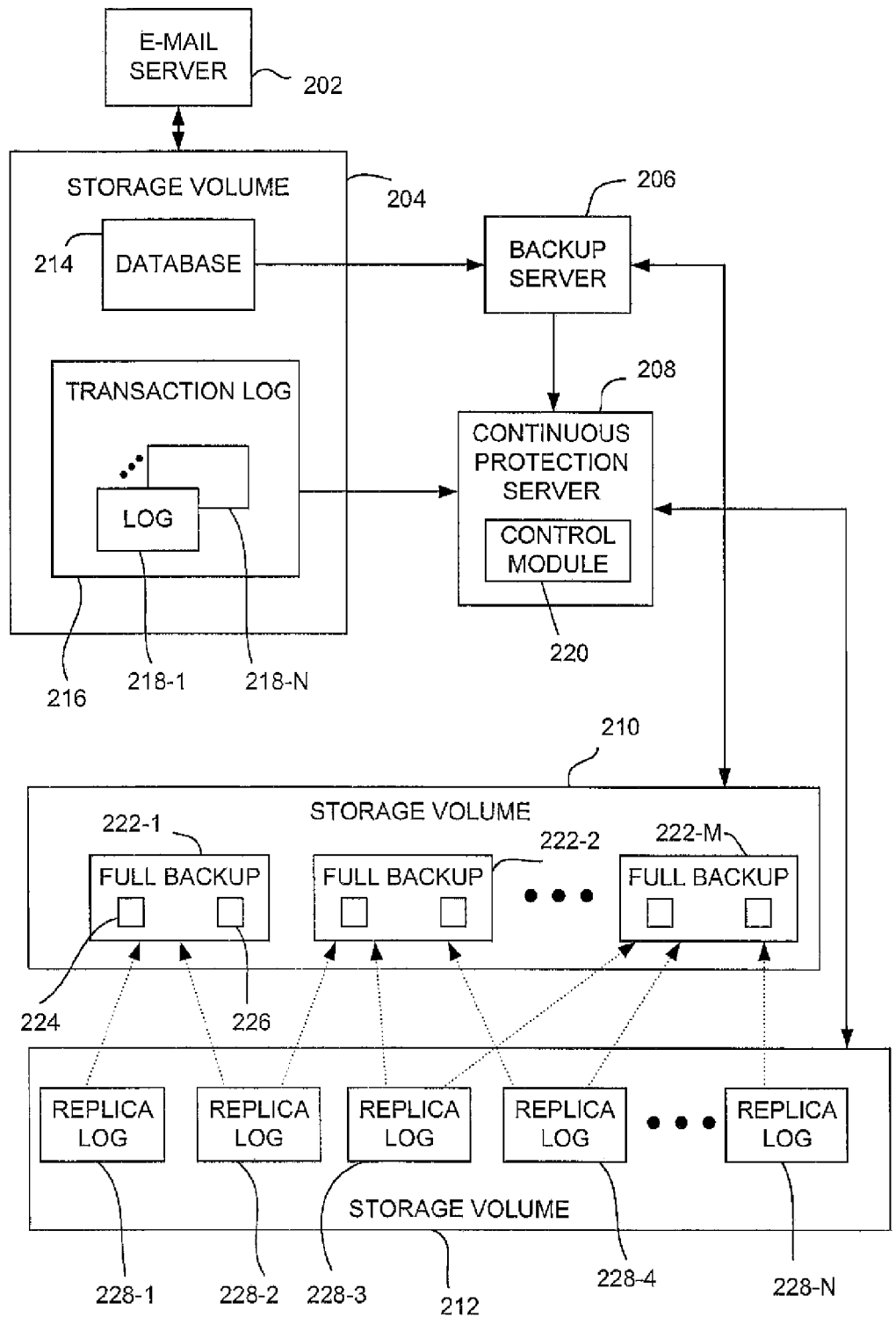
FIG. 2 is a block diagram depicting an exemplary embodiment of a portion of a computer network in accordance with one or more aspects of the invention.

Aspects of the invention may be understood with respect to the following example. FIG. 2 is a block diagram depicting an exemplary embodiment of a portion 200 of a computer network in accordance with one or more aspects of the invention. The portion 200 includes an e-mail server 202, a storage volume 204, a backup server 206, a continuous protection server 208, a storage system 210, and a storage volume 212. The e-mail server 202 may be implemented using any type of computer system suitable for such purpose. The backup server 206 and the continuous protection server 208 may be implemented using the same computer system or different computer systems. The storage volumes 204, 210, and 212 may be implemented using one or more storage systems (e.g., disk drive systems).

The e-mail server 202 is coupled to the storage volume 204. The storage volume 204 is configured to store a database 214 (e.g., user mailboxes, contacts, calendars, task lists, and the like) and a transaction log 216. The transaction log 216 includes changes to be made to the database 214. Before changes are actually made to the database 214, the changes are written to the transaction log 216. After a change has been safely logged, it can then be written to the database 214. The transaction log 216 can be used to recover the database 214 should it become corrupt, lost, or otherwise unusable. Thus, the transaction log 216 is typically deemed to be critical to the e-mail server 202. The transaction log 216 includes log files 218-1 through 218-N (collectively log files 218), where N is an integer greater than zero. An exemplary e-mail server that generates a transaction log includes EXCHANGE Server available from Microsoft Corporation.

The backup server 206 manages the storage volume 210. The backup server 206 is configured to perform scheduled backups at points in time of the database 214. The storage volume 210 stores full backup 222-1 through 222-M (collectively full backups 222), where M is an integer greater than zero. Each of the full backups 222 includes a backup of the database 214 at a particular point in time (referred to as partial backup 224).

The continuous protection server 208 manages the storage volume 212. The continuous protection server 208 is configured to perform continuous backup of the transaction log 216. The storage volume 212 maintains a replica of the transaction log 216 at any given time. In the present example, the storage volume 212 includes replica logs 228-1 through 228-N respectively corresponding to the logs 218-1 through 218-N.

Assume at time T1 the backup server 206 creates the partial backup 224 of the database 214 in the full backup 222-1. The backup server 206 notifies the continuous protection server 208 of the location of the full backup 222-1 in the storage volume 210. Assume at time T1, the transaction log 216 includes logs 218-1 and 218-2. Accordingly, the storage volume 212 includes replica logs 228-1 and 228-2. In response to the notification from the backup server 206, a control module 220 in the continuous protection server 208 creates links 226 in the full backup 222-1 to the replica logs 228-1 and 228-2. The links 226 may comprise hard links, as described above. The links 226 are symbolically shown by the arrows from the replica logs 228-1 and 228-2 to the full backup 222-1. The process occurs each time the backup server 206 creates a partial backup of the database 214.

Figure 3:
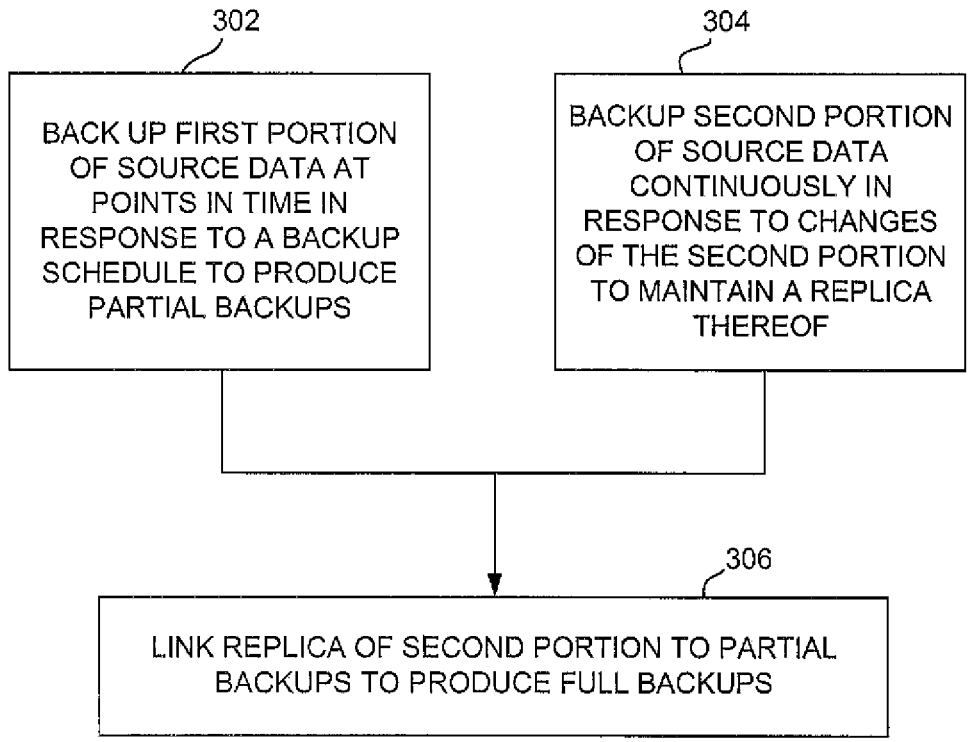
FIG. 3 is a flow diagram depicting an exemplary embodiment of a method for backing up source data stored by a computer system in accordance with one or more aspects of the invention.

FIG. 3 is a flow diagram depicting an exemplary embodiment of a method 300 for backing up source data stored by a computer system in accordance with one or more aspects of the invention. The method 300 begins at step 302, where a first portion of the source data is backed up at points in time in response to a backup schedule to produce partial backups. At step 304, a second portion of the source data is backed up continuously in response to changes of the second portion to maintain a replica of the second portion. Notably, steps 302 and 304 are performed contemporaneously. That is, the continuous backup in step 304 is performed continuously while the partial backups are produced in step 302 for the points in time. At step 306, the replica of the second portion is linked to each of the partial backups to produce full backups of the source data. In one embodiment, the second portion of the source data includes a plurality of files. In step 306, each of the plurality of files in the replica is linked to at least one of the partial backups. In an embodiment, the source data comprises a database and a transaction log of an e-mail server. The first portion comprises the database, and the second portion comprises the transaction log.

Figure 4:
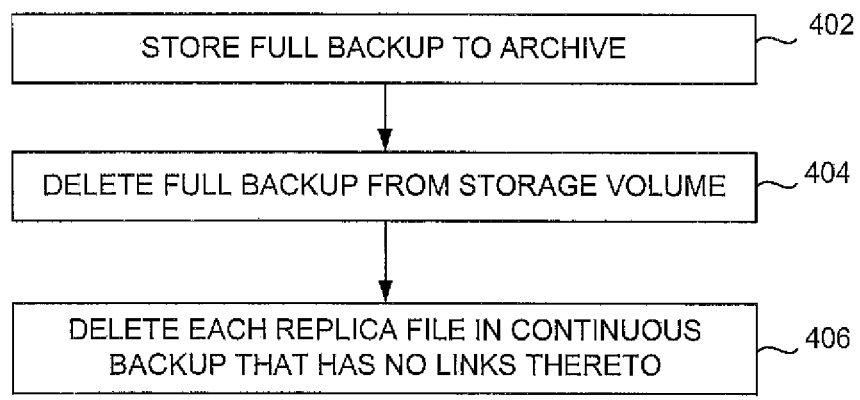
FIG. 4 is a flow diagram depicting an exemplary embodiment of a method for migrating a full backup from a storage volume to archival storage in accordance with one or more aspects of the invention.

FIG. 4 is a flow diagram depicting an exemplary embodiment of a method 400 for migrating a full backup from a storage volume to archival storage in accordance with one or more aspects of the invention. The method 400 begins at step 402, where a full backup is stored to an archive. For example, the full backup may be stored on tape media in a tape drive system. At step 404, the full backup is deleted from the storage volume. Deletion of a full backup will result in deletion of links to replica files maintained as part of the continuous backup. At step 406, each replica file in the continuous backup that has no links thereto is deleted from the continuous backup. Step 406 may be performed automatically in accordance with the function of the file system (e.g., NTFS). The method 400 may be repeated for multiple full backups.

Figure 5:
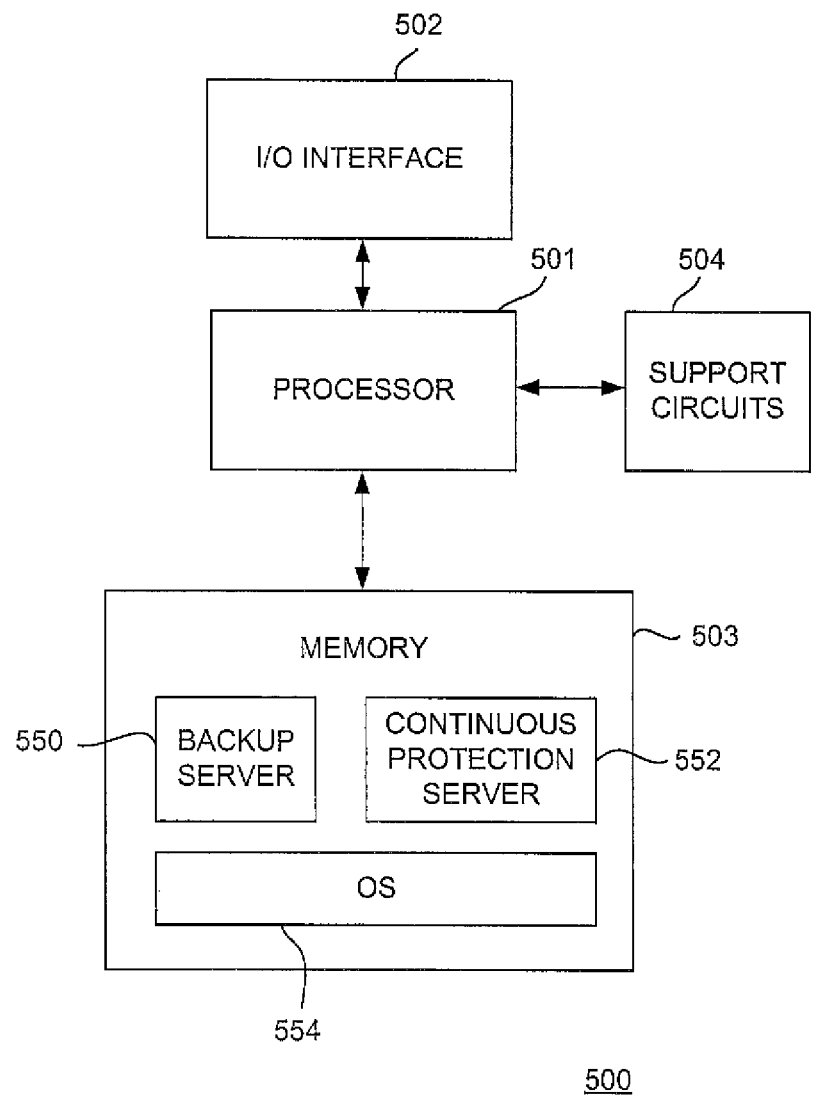
FIG. 5 is a block diagram depicting an exemplary embodiment of a computer system in accordance with one or more aspects of the invention.

FIG. 5 is a block diagram depicting an exemplary embodiment of a computer system 500 in accordance with one or more aspects of the invention. The computer system 500 may be used to implement any of the various servers described above, including the backup server and/or the continuous protection server. The computer system 500 includes a processor 501, a memory 503, various support circuits 504, and an I/O interface 502. The processor 501 may include one or more microprocessors known in the art. The support circuits 504 for the processor 501 include conventional cache, power supplies, clock circuits, data registers, I/O interfaces, and the like. The I/O interface 502 may be directly coupled to the memory 503 or coupled through the processor 501. The I/O interface 502 may also be configured for communication with a network, with various storage devices, as well as other types of input and output devices (e.g., mouse, keyboard, display, etc).

The memory 503 stores processor-executable instructions and/or data that may be executed by and/or used by the processor 501. These processor-executable instructions may comprise hardware, firmware, software, and the like, or some combination thereof. Modules having processor-executable instructions that are stored in the memory 503 may include a backup server 550 and/or a continuous protection server 552. The backup server 550 is configured to perform scheduled backups of a first portion of source data. The continuous protection server 552 is configured to continuously back up a second portion of the source data. The computer system 500 may be programmed with an operating system 554, which may be OS/2, Java Virtual Machine, Linux, Solaris, Unix, Windows, Windows95, Windows98, Windows NT, and Windows2000, WindowsME, and WindowsXP, Windows Server, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method comprising:
   performing a plurality of periodic backups of a database portion of a source data, wherein
      the source data comprises the database portion and a transaction log portion, and
      the performing the plurality of periodic backups generates a plurality of partial backups;
   performing a continuous backup of the transaction log portion of the source data, wherein
      the performing the continuous backup generates a plurality of backup transaction logs,
   creating, using one or more processors, a plurality of links to the plurality of the backup transaction logs, wherein
      each of the plurality of links references one of the plurality of the backup transaction logs,
      each of the plurality of links is stored using memory accessible by the one or more processors, and
      the creating comprises
         creating a respective new link of the plurality of links responsive to each respective backup transaction log of the plurality of backup transaction logs being generated, and
   storing a full backup of the source data, wherein
      the full backup of the source data comprises:
         a first partial backup of the plurality of partial backups, wherein
            the first partial backup comprises
               a backup of the source data generated at a first of the plurality of periodic backups, and
               a subset of the plurality of links, wherein
                  the subset of the plurality of links references a subset of the plurality of the backup transaction logs.

2. The method of claim 1, wherein
   the creating of the plurality of links comprises
      in response to each of the plurality of the periodic backups being performed, creating one or more respective links of the plurality of links.

3. The method of claim 1, wherein
   the transaction log portion indicates changes to the database portion, and
   each of the plurality of backup transaction logs corresponds to a transaction log in the transaction log portion.

4. The method of claim 1, wherein
   the performing the plurality of periodic backups is performed according to a backup schedule, and
   the first of the plurality of periodic backups is performed at a first time of the backup schedule.

5. The method of claim 1, wherein
   the subset of the plurality of links comprises
      a first link to a first backup transaction log of the subset of the backup transaction logs, and
      a second link to a second backup transaction log of the subset of the backup transaction logs.

6. The method of claim 5, wherein
   another subset of the plurality of links comprises links to another subset of the plurality of the backup transaction logs,
   the another subset of the plurality of the backup transaction logs is associated with a second partial backup of the plurality of partial backups, and
   the another subset of the plurality of links comprises a link to the first backup transaction log.

7. The method of claim 1, wherein the storing the full backup comprises:
   creating, for each backup transaction log in the subset of the plurality of the backup transaction logs, a directory entry in at least one of the plurality of partial backups.

8. The method of claim 1, wherein
   the subset of the plurality of the backup transaction logs is associated with the first partial backup.

9. The method of claim 1, further comprising:
   storing the full backup at a storage volume;
   deleting the full backup from the storage volume, wherein
      each backup transaction log in the first subset of the backup transaction logs is not deleted until there are no other full backups that comprise links to the each respective backup transaction log.

10. The method of claim 1, wherein
    the computer system comprises an e-mail server.

11. An apparatus comprising:
    a first backup server configured to perform periodic backups of a database portion of the source data, wherein
       the source data comprises the database portion and a transaction log portion, and
       the backup server is configured to perform the periodic backups to produce a plurality of partial backups;
    a second backup server configured to perform a continuous backup of the transaction log portion of the source data, wherein
       the continuously backing up generates a plurality of backup transaction logs; and
    a control module configured to
       create a plurality of links to the plurality of the backup transaction logs, wherein
          each of the plurality of links references one of the plurality of the backup transaction logs, and
          each of the plurality of links is stored using memory, and
       the control module is configured to perform the creating by
          creating a respective new link of the plurality of links responsive to each respective backup transaction log of the plurality of backup transaction logs being generated, and
       store a full backup of the source data, wherein
          the full backup of the source data comprises:
             a first partial backup of the plurality of partial backups, wherein
                the first partial backup comprises
                   a backup of the source data generated at a first of the plurality of periodic backups, and
                   a subset of the plurality of links, wherein the subset of the plurality of links references a
subset of the plurality of the backup transaction
logs.

12. The apparatus of claim 11, wherein
the subset of the plurality of links comprises
   a first link to a first backup transaction log of the subset of the backup transaction logs, and
   a second link to a second backup transaction log of the subset of the backup transaction logs.

13. The apparatus of claim 11, wherein the
another subset of the plurality of links comprises links to another subset of the plurality of the backup transaction logs,
the another subset of the plurality of the backup transaction logs is associated with a second partial backup of the plurality of partial backups, and
the another subset of the plurality of links comprises a link to the first backup transaction log.

14. The apparatus of claim 7, wherein
the control module is further configured to
   create, for each backup transaction log in the subset of the plurality of the backup transaction logs, a directory entry in at least one of the plurality of partial backups.

15. The apparatus of claim 11, wherein
the control module is further configured to
   store the full backup at a storage volume, and
   delete the full backup from the storage volume, wherein
      each backup transaction log in the first subset of the backup transaction logs is not deleted until there are no other full backups that comprise links to the each respective backup transaction log.

16. A computer program product comprising:
a plurality of instructions, comprising
   a first set of instructions, executable on a computer system, configured to perform a plurality of periodic backups of a database portion of a source data, wherein
      the source data comprises the database portion and a transaction log portion, and
      the performing the plurality of periodic backups generates a plurality of partial backups,
   a second set of instructions, executable on the computer system, configured to performing a continuous backup of the transaction log portion of the source data, wherein
      the performing the continuous backup generates a plurality of backup transaction logs,
   a third set of instructions, executable on the computer system, configured to create a plurality of links to the plurality of the backup transaction logs, wherein
      each of the plurality of links references one of the plurality of the backup transaction logs,
      each of the plurality of links is configured to be stored using memory of the computer system, and
      the creating comprises
         creating a respective new link of the plurality of links responsive to each respective backup transaction log of the plurality of backup transaction logs being generated, and
   a fourth set of instructions, executable on the computer system, configured to store a full backup of the source data, wherein the full backup of the source data comprises:
   a first partial backup of the plurality of partial backups, wherein
      the first partial backup comprises
         a backup of the source data generated at a first of the plurality of periodic backups, and
         a subset of the plurality of links, wherein
            the subset of the plurality of links references a subset of the plurality of the backup transaction logs; and
a non-transitory computer-readable storage medium, wherein the instructions are encoded in the computer-readable storage medium.

17. The computer program product of claim 16, wherein
the subset of the plurality of links comprises
   a first link to a first backup transaction log of the subset of the backup transaction logs, and
   a second link to a second backup transaction log of the subset of the backup transaction logs.

18. The computer program product of claim 16, wherein
the another subset of the plurality of links comprises links to another subset of the plurality of the backup transaction logs,
the another subset of the plurality of the backup transaction logs is associated with a second partial backup of the plurality of partial backups, and
the another subset of the plurality of links comprises a link to the first backup transaction log.

19. The computer program product of claim 16, wherein
the instructions further comprise:
   a sixth set of instructions, executable on the computer system, configured to create, for each backup transaction log in the subset of the plurality of the backup transaction logs, a directory entry in at least one of the plurality of partial backups.

20. The computer program product of claim 16, wherein
the instructions further comprise:
   a sixth set of instructions, executable on the computer system, configured to store the full backup at a storage volume, and
   a seventh set of instructions, executable on the computer system, configured to delete the full backup from the storage volume, wherein
      each backup transaction log in the first subset of the backup transaction logs is not deleted until there are no other full backups that comprise links to the each respective backup transaction log.

21. The method of claim 1, wherein
the creating of the plurality of links comprises
   in response to the first of the plurality of the periodic backups being performed, creating the subset of links.

22. The method of claim 1, wherein
the first partial backup is created at a first point in time, and
the creating of the plurality of links further comprises
   creating the subset of the plurality of links in response to a creation of the first partial backup at the first point in time.

23. The method of claim 22, wherein
the creating the subset of the plurality of links comprises
   determining the subset of the plurality of the backup transaction logs that correspond to the first point in time.

24. The method of claim 22, wherein
the creating the subset of the plurality of links in response to the creation of the first partial backup at the first point in time comprises creating the subset of the plurality of links in response to receiving a notification,
wherein
the notification indicates a location of the full backup of the source data.

25. The method of claim 24, wherein
the full backup is created prior to the creating the subset of the plurality of links.

26. The method of claim 1, wherein
each of the respective new links references a different one of the plurality of backup transaction logs.

* * * * *